United States Patent [19]
Armstrong

[11] 3,732,675
[45] May 15, 1973

[54] CATCHER FOR ROTARY MOWER

[75] Inventor: William H. Armstrong, Bloomfield Hills, Mich.

[73] Assignee: Montgomery Ward & Co.,, Chicago, Ill.

[22] Filed: Feb. 22, 1972

[21] Appl. No.: 227,818

[52] U.S. Cl. ............................................. 56/202
[51] Int. Cl. ............................................. A01d 35/22
[58] Field of Search ..................... 56/202, 198–200

[56] References Cited

UNITED STATES PATENTS

| | | | |
|---|---|---|---|
| 2,855,745 | 1/1958 | Phelps | 56/202 |
| 1,917,782 | 7/1933 | Vachon | 56/202 UX |
| 2,882,668 | 4/1959 | Murillo | 56/202 X |
| 2,856,746 | 10/1958 | Machalk | 56/202 |
| 2,836,029 | 5/1958 | Johnson | 56/202 UX |

FOREIGN PATENTS OR APPLICATIONS

| | | | |
|---|---|---|---|
| 716,774 | 8/1965 | Canada | 56/202 |
| 546,180 | 9/1957 | Canada | 56/202 |

Primary Examiner—Hugh R. Chamblee
Assistant Examiner—J. A. Oliff
Attorney—Carpenter, Ostis & Lindberg

[57] ABSTRACT

A grass cuttings catcher for a rotary type mower having a discharge opening consists of a pair of frames surrounded by a flexible shroud including means for securing one of the frames to the deck of the mower. The frame members and the shroud define a chamber for the storage of the cuttings. The shroud is provided with an end wall supported by the frame members and is formed from flexible material, including means for holding the end wall into position to the shroud. The catcher is supported as a cantilever from the mower deck, and the lower frame of the catcher is provided with a deflector causing the cuttings to be diverted upward within the chamber so as to fall to the lower part of the chamber at a point remote from the discharge opening of the mower. The catcher is also characterized by upper and lower frame members having a toggle connection therebetween whereby the catcher may be collapsed and stored readily.

4 Claims, 9 Drawing Figures

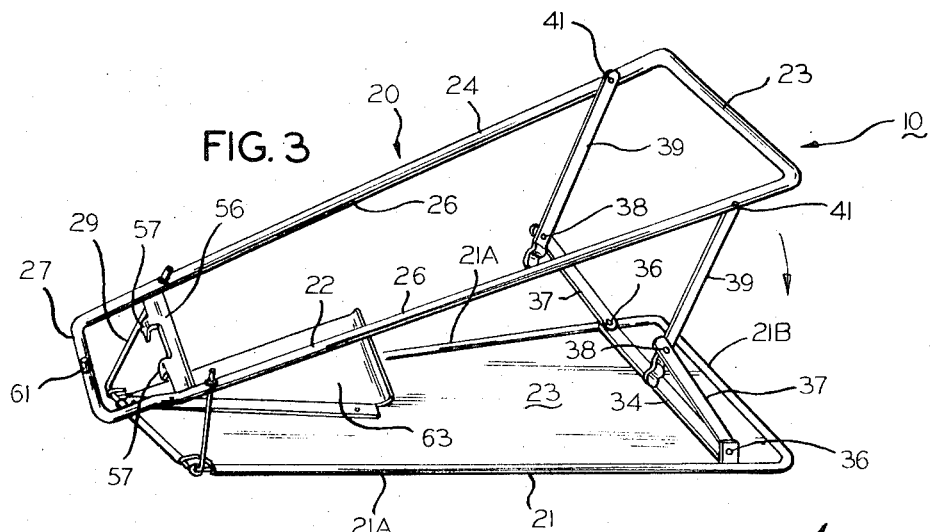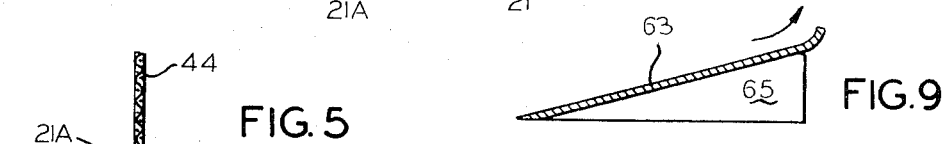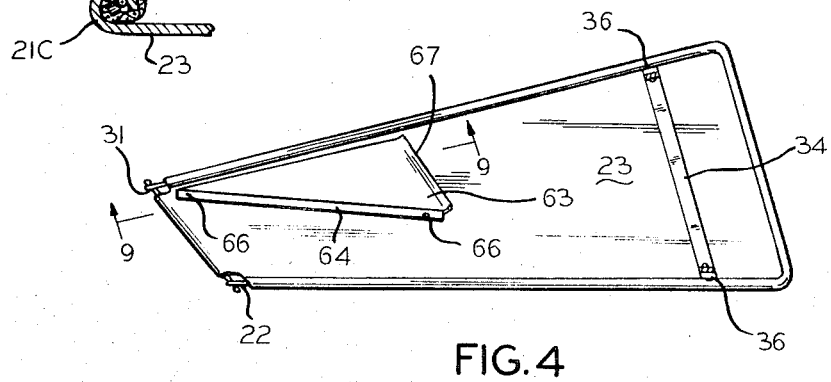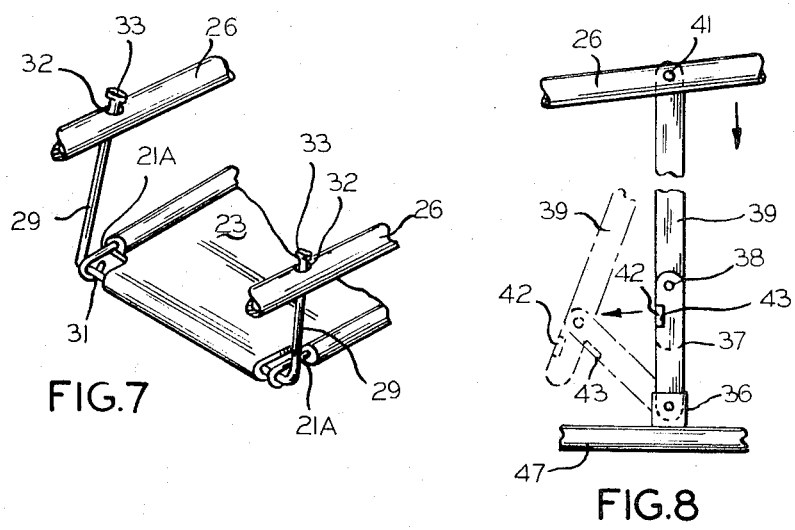

CATCHER FOR ROTARY MOWER

BACKGROUND OF THE INVENTION

1. Field of the Invention

The invention relates to grass catchers particularly adapted for use with rotary type mowers.

2. The Prior Art

The prior art appears to be best exemplified in the following patents which were developed in a careful search.

| Phelps | 2,855,745 | Oct. 14, 1958 | 56/202 |
| Machalk | 2,856,746 | Oct. 21, 1958 | 56/202 |

SUMMARY OF THE INVENTION

The improved grass catcher according to the present invention is characterized by upper and lower frame members enclosed within a shroud made of foraminous material, the upper frame member being supported in a cantilever fashion from the deck of the mower adjacent the discharge opening thereof. The catcher is characterized by an increasing transverse cross-sectional area, to the end that the velocity of the stream of cuttings-laden air emerging at the discharge opening will diminish rapidly to lower the velocity of the supporting air stream and cause the cuttings to be separated therefrom readily. The catcher is also characterized by a deflector disposed in the lower portions thereof, the deflector causing the cuttings-laden air to be diverted upward and to cause the cuttings to be deposited within the catcher at a point remote from the discharge opening of the mower. The foraminous shroud is provided with an end wall remote from the discharge of the mower, the flexible wall being readily moved to a position for discharge of the cuttings from the catcher. The upper and lower frame members are connected by a collapsible toggle whereby the catcher may readily be stored.

THE DRAWINGS

FIG. 3 is an isometric view of a frame forming part of the catcher seen in FIGS. 1 and 2;

FIG. 4 is a plan view of the bottom frame members of the catcher frame of FIG. 3;

FIG. 5 is a detailed transverse sectional view through one of the lower frame members showing the manner in which a bottom plate and a side of the shroud are held in position to the bottom frame members of FIG. 4;

FIG. 7 is an isometric view showing details of the frame structure adjacent the discharge opening of the mower;

FIG. 8 is a side elevational view showing details of a toggle connection between the upper and lower frame members whereby the catcher can be collapsed for storage; and FIG. 9 is a detailed sectional view taken along the line 9—9 of FIG. 4 looking in the direction of the arrows, showing details of a deflector for the cuttings-laden air stream.

SPECIFICATION

Figure 1:
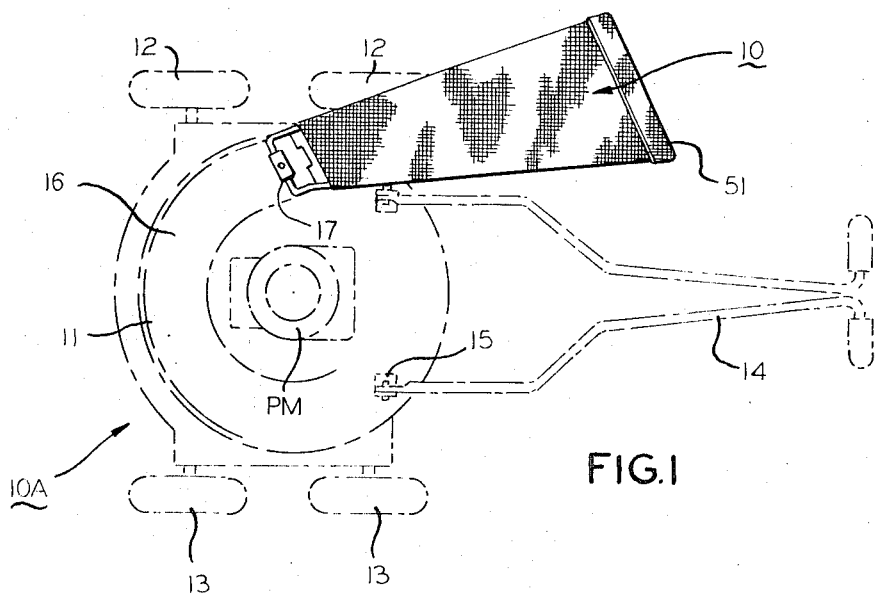
FIG. 1 is a plan view of a rotary type mower showing the catcher according to the present invention disposed in operable relationship thereto.

The improved grass cuttings catcher according to the present invention is referred to generally by the reference numeral 10 and is shown in the environment of a rotary type mower 10A. The latter has a blade housing 11 which may be formed integrally with structure for supporting ground engaging wheels 12 located in such a fashion as to enable the mower to traverse the terrain. A pushing or towing handle 14 is connected to the housing 11 at bracket members 15. The mower has a conventional rotor blade, not shown, which is powered by a prime mover PM supported on the housing 11.

Mower 10A has a discharged volute 16 for cuttings moved by the rotor blade, which cuttings are discharged therefrom at a discharge opening 17 in housing 11. The precise form of mower 10A, the arrangement of the ground engaging wheels 12, the volute 16 and discharge opening 17 therefrom form no part of the present invention, and merely provide background for the invention.

The grass cuttings catcher 10 includes a frame indicated generally by the reference numeral 20 which is enclosed by a foraminous shroud indicated generally by the reference numeral 20A. Frame 20 includes a generally U-shaped lower frame 21 having laterally spaced frame limbs 21A connected by a frame element 21B. An upper frame 24 has a configuration generally like frame 21, and is spaced above the lower frame 21. Frame 24 includes side frame elements 26 connected by an end frame element 28 and an opposed shorter frame element 27 to define with frame 20 a generally truncated pyramidal-shaped structure. Lower frame 21 has a floor plate 23 extending therebetween, and the edges of the plate 23 are curled about the lower frame elements 21A as at 21C.

One end of the floor plate 23 is curled about a transversely extending lower frame element 31, and the frame members 21A are similarly curled about the element 31 as seen more clearly in FIG. 7. The ends of the frame element 31 are provided with upstanding rod-like elements 29 having the upper ends thereof passing through apertures 32 in the upper frame members 26, the upper ends of members 29 being flattened as at 33 so as to provide a non-separable connection between the frame members 26 and rod-like elements 29, yet permitting movement of frame members 26 with respect thereto.

Structure is provided for effecting a connection between the upper frame elements 26 and the lower frame elements 21A adjacent the other ends thereof, and accordingly floor plate 23 has a transverse extending strip 34 riveted thereto, strip 34 terminating at each end in upstanding brackets 36. Lower toggle arms 37 are pivoted at the lower ends thereof to brackets 36, and has its upper end pivoted at 38 to an upper toggle arm 39, it in turn being pivotally connected at 41 to the upper frame member 26. The toggle arms 37 and 39 are moved between a collapsed position and an erected position as seen in FIG. 8. A locking structure is provided for the toggle arms 37 and 39 consisting of a lug 42 at the lower end of the upper toggle arm 39 and cooperating with a slot 43 in lower toggle arm 37.

Figure 2:
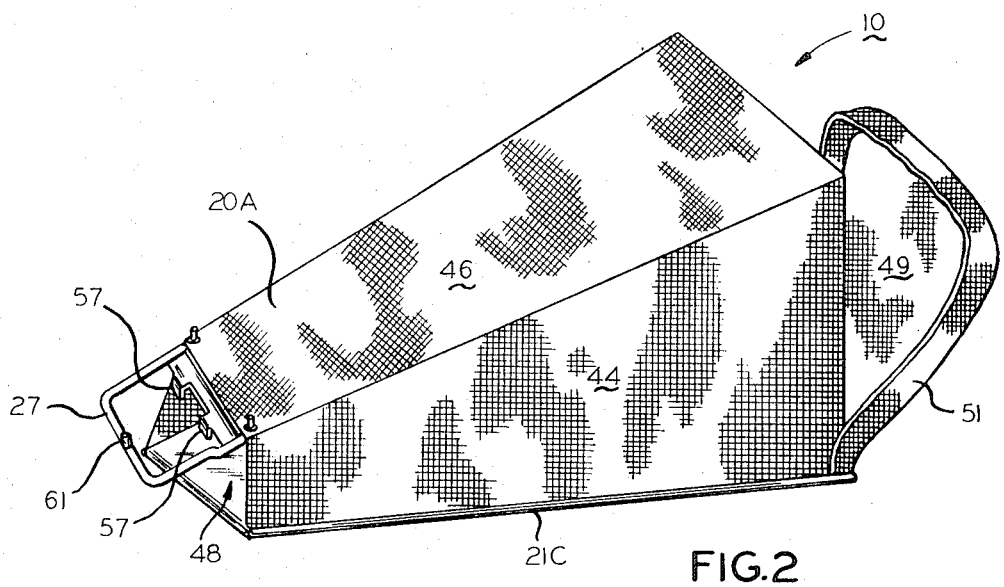
FIG. 2 is an isometric view of the catcher seen in FIG. 1.
Figure 6:
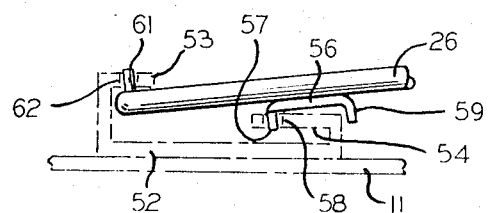
FIG. 6 is a detailed side view showing the manner of supporting the upper frame members to the deck of the mower adjacent its discharge opening.

The frame 20 thus far described is adapted to be enclosed within the shroud 20A seen in FIG. 2 and to support the same. The latter has side panels 44 connected by an upper panel 46, the material of the panels 44 and 46 being foraminous for exit of air propelled by mower 10. The lower ends of the side panels 44 are secured in position by the curled-in portions 21C, see also FIG. 5.

Shroud 20A has an entrance opening 48 and a rear wall 49 remote from the entrance opening 48, rear wall 49 also preferably being made of foraminous material for the escape of air. End wall 49 has a narrow skirt 51 preferably provided with elastic therein whereby skirt 51 may be closed and placed in position about the side and top walls 44 and 46. The lower edge of end wall 49 is held to the lower frame members in the same fashion as the side walls 44 seen in FIG. 5.

Structure is provided for holding grass catcher 10 in position on the deck 11 of the mower 10A, and to this end a bracket 52 is secured atop deck 11, and above discharge opening 17. Bracket 52 has a pair of opposed and confronting horizontal limbs 53 extending from opposite ends thereof, limb 53 being disposed somewhat higher than limb 54. A strap member 56 extends between the two upper frame members 26,26 and is provided with spaced depending tangs 57, each extending into an aperture 58 formed in limb 54. Strap member 56 also has tangs 59 depending therefrom and spaced from the tangs 57 so as to engage the limbs 54 at a point remote from the apertures 58 therein.

Frame member 27 connecting the two frame members 24 is provided with an upstanding central boss 61 extending through an opening 62 in the limb 53.

It will be noted that frame member 26 is brought beneath limb 53 and over limb 54, so that upper frame 20 and frame members 21A and 21B pendent therefrom together with the shroud 21A are supported in cantilever fashion at the bracket 52. By reason of the arrangement of the boss 61 and tangs 57 and 59, the entire assembly is prevented from swiveling with respect to the discharge opening 17. It may also be noted that there is no requirement for the catcher 20 to be suspended from the operating handle 14 as is generally customary.

Structure is provided for diverting the grass-laden current of air discharged from the mower 10A, the cuttings being diverted upward and toward the end of the shroud 20A remote from discharge opening 17 and being deposited upon floor plate 23.

It may be noted that the transverse cross-sectional area of the catcher 10 is at a minimum adjacent the discharge opening 17, increasing to a maximum at the end wall 49. By reason of such increase in cross-sectional area, the velocity of the grass-laden air emerging at the discharge opening 17 to reduce its velocity, the air separated from the grass emerging from the openings in the foraminous side, top and ends as seen in FIG. 2.

I claim:

1. In a grass cuttings catcher for a rotary type mower having a deck enclosing a rotor blade and a discharge opening from said deck, said catcher comprising:
   a. a collapsible frame surrounded by a flexible foraminous shroud including means for securing said frame to said deck, said frame including:
      i. a lower frame comprising a pair of diverging lower frame members lying in an essentially horizontal plane;
      ii. an upper frame spaced from said lower frame and comprising diverging upper frame members lying in a plane in diverging relation-ship with respect to said lower frame to define with said lower frame and said shroud a chamber for storage of said cuttings;
      iii. a non-separable connection between said upper and lower frames where said frames are essentially closest to each other;
   b. means connecting said upper and lower frames adjacent points where said frames are essentially furthest from each other comprising a pair of collapsible toggle arms said arms being toggled to collapse said upper and lower frame for storage;
   c. an end wall in said shroud supported by said frame members and formed from flexible material including means for holding said end wall in position to said shroud.

2. A catcher according to claim 1 wherein said end wall is provided with a skirt embracing the sides of top of said shroud.

3. A catcher according to claim 1 wherein said collapsible frame cooperates with means mounted on said mower for securing said frame as a cantilever extending from said mower.

4. A catcher according to claim 1 wherein said lower frame is provided with a deflector for diverting cuttings-laden air to that portion of said catcher remote from said discharge opening.

* * * * *